United States Patent
Zhao et al.

(10) Patent No.: US 12,264,382 B2
(45) Date of Patent: Apr. 1, 2025

(54) METHOD FOR EXTRACTING LITHIUM USING RESIN ADSORBENT TO PRETREAT LOW-GRADE DEEP BRINES

(71) Applicant: Qinghai Geological and Mineral Testing Center, Qinghai Province (CN)

(72) Inventors: Yuqing Zhao, Qinghai Province (CN); Yongpeng Ying, Qinghai Province (CN); Xin Xiong, Qinghai Province (CN); Hongshu Fang, Qinghai Province (CN); He Jiao, Qinghai Province (CN); Liping Wu, Qinghai Province (CN); Fang Jin, Qinghai Province (CN); Dao Liu, Qinghai Province (CN); Haiming Li, Qinghai Province (CN)

(73) Assignee: Qinghai Geological and Mineral Testing Center, Qinghai Province (CN)

( * ) Notice: Subject to any disclaimer, the term of this patent is extended or adjusted under 35 U.S.C. 154(b) by 748 days.

(21) Appl. No.: 17/576,348

(22) Filed: Jan. 14, 2022

(65) Prior Publication Data
US 2023/0227937 A1 Jul. 20, 2023

(51) Int. Cl.
C22B 3/42 (2006.01)
C22B 26/12 (2006.01)

(52) U.S. Cl.
CPC ............... *C22B 3/42* (2013.01); *C22B 26/12* (2013.01)

(58) Field of Classification Search
CPC ... C22B 3/42; C22B 26/12; C22B 3/24; Y02P 10/20
See application file for complete search history.

(56) References Cited

FOREIGN PATENT DOCUMENTS

| CN | 101508450 A | * | 8/2009 | ............ C01D 15/08 |
|---|---|---|---|---|
| CN | 103523801 A | * | 1/2014 | |
| CN | 106629789 A | * | 5/2017 | |
| CN | 111533146 A | * | 8/2020 | |
| CN | 113511663 A | * | 10/2021 | |

* cited by examiner

*Primary Examiner* — Anthony J Zimmer
*Assistant Examiner* — Abdul-Rahman Yusuf Waleed Smari
(74) *Attorney, Agent, or Firm* — Barclay Damon LLP

(57) ABSTRACT

The present disclosure provides a method for extracting lithium using a resin adsorbent to pretreat low-grade deep brine, which relates to the technical field of lithium extraction from brine. In the present disclosure, resin adsorbent is used to perform adsorption pretreatment on the concentrated brine, which can adsorb organic impurities in the concentrated brine without adsorbing lithium ions, so that the concentration of lithium ions is almost unchanged compared with the feed material, with the subsequent manganese-based lithium adsorbent, the adsorption rate of lithium can be increased by 41%; At the same time, pretreating the concentrated brine using resin adsorbents has shorter steps, less materials, and does not produce a large amount of low-value product gypsum, which makes the lithium extraction process simpler and easier to operate, and reduces production costs.

20 Claims, 1 Drawing Sheet

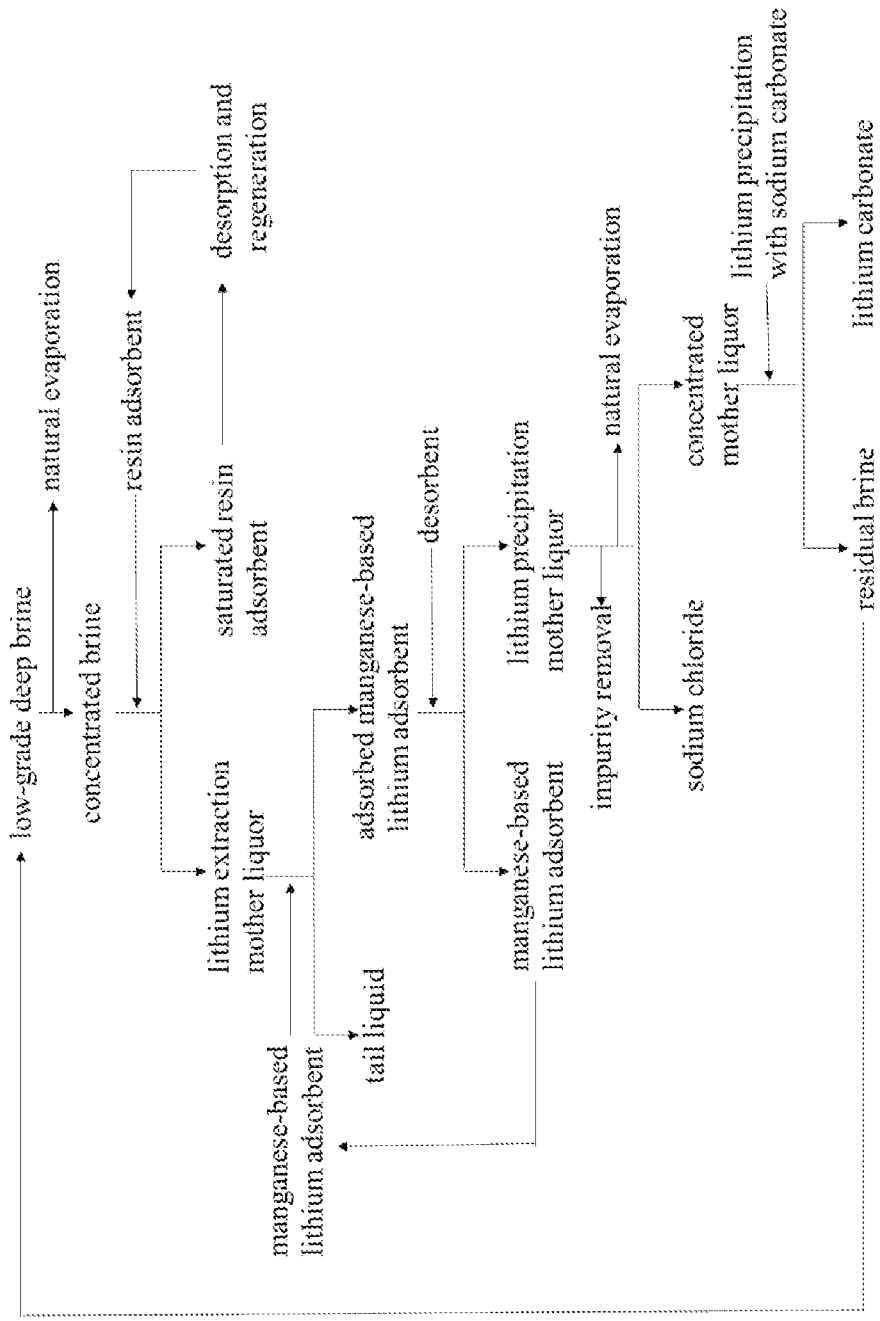

METHOD FOR EXTRACTING LITHIUM USING RESIN ADSORBENT TO PRETREAT LOW-GRADE DEEP BRINES

TECHNICAL FIELD

The present disclosure relates to the technical field of lithium extraction from brine, and in particular to a method for extracting lithium using a resin adsorbent to pretreat low-grade deep brine.

BACKGROUND ART

The grades of lithium resource in the salt-lake brines are uneven. There are many elements such as boron, potassium, magnesium, sodium, rubidium, cesium, and bromine associated with lithium in salt-lake brines. In particular, the lithium-rich salt-lake brines in Qinghai province are mostly of magnesium sulfate subtype and chloride type with a relatively high magnesium-lithium ratio, e.g., the magnesium-lithium ratio in the salt-lake brine in Qaidam Basin in Qinghai Province is as high as 40-1200, the large amount of magnesium makes the separation of lithium and magnesium difficult, the technical bottleneck of lithium extraction from brine is difficult to break through, and the extraction of lithium resources with high magnesium-lithium ratio is a worldwide problem. At the same time, salt-lake brines contain a lot of calcium, so in the process of extracting lithium, it is necessary to treat concentrated brines using lime-mirabilite method for removing calcium and magnesium, which not only consumes a large amount of lime-mirabilite, increases production costs, but also takes a long time to process, and generates a large amount of low-value product gypsum. At present, the salt lakes where lithium resources have been developed in the Qaidam Basin include East Taijinair Salt Lake, West Taijinair Salt Lake, Bieletan area of Qarhan Salt Lake, Yiliping Salt Lake and Da Qaidam Salt Lake. These lithium resources under development are all intercrystal brines, and the magnesium-lithium ratio and calcium-lithium ratio are both low. For example, the magnesium-lithium ratio of the lithium resource developed in East Taijinair Salt Lake is 40 and the calcium-lithium ratio is 0.23, the magnesium-lithium ratio of the lithium resource developed in West Taijinair Salt Lake is 65 and the calcium-lithium ratio is 0.78, the magnesium-lithium ratio of the lithium resource developed in Bieletan area of Qarhan Salt Lake is 200, the calcium-lithium ratio is 0.98, the magnesium-lithium ratio of the lithium resource developed in Yiliping Salt Lake is 90, the calcium-lithium ratio is 1.43, and the magnesium-lithium ratio of the lithium resource developed in Da Qaidam Salt Lake is 120, and the calcium-lithium ratio is 0.77. There is currently no good treatment method for salt-lake brine with low magnesium-lithium ratio and high calcium-lithium ratio. In addition, with the gradual development of high-grade shallow salt-lake brines, the development of low-grade deep salt-lake brines is on the agenda. However, deep salt-lake brines not only contain a higher calcium-lithium ratio, but also contain more organic impurities. These organic impurities will further reduce the adsorption effect of the manganese-based lithium adsorbent, resulting in a very low operating recovery rate of lithium.

The current lithium extraction methods mainly include: adsorption, selective ion transfer, calcination, centrifugal extraction and nanofiltration membrane separation, but these methods have higher requirements for the magnesium-lithium ratio and calcium-lithium ratio in salt-lake brines. Generally, the magnesium-lithium ratio is less than or equal to 200, and the calcium-lithium ratio is less than or equal to 2. When recovering lithium in low-grade salt-lake brines, the recovery rate of Li is generally less than 40%, and the recovery rate of brine is also very low, resulting in a large amount of waste of resources and a substantial increase in product composition, which cannot satisfy market competition. With the gradual development of high-grade salt-lake brines, the development of low-grade salt-lake brines is on the agenda. Therefore, providing a method for extracting lithium from low-grade salt-lake brines with a low magnesium-lithium ratio and a high calcium-lithium ratio has become an urgent technical problem in this field.

SUMMARY

The purpose of the present disclosure is to provide a method for extracting lithium using a resin adsorbent to pretreat low-grade deep brines, the method for extracting lithium provided by the present disclosure is simple and easy to operate, which can reduce production costs, recover lithium in low-grade deep brine with a high calcium-lithium ratio, and has a high recovery rate of lithium, concentrated brines and low-grade deep brines.

In order to achieve the above purpose, the present disclosure provides the following technical schemes:

The present disclosure provides a method for extracting lithium using a resin adsorbent to pretreat low-grade deep brines, including the following steps:
(1) Concentrating a low-grade deep brine to obtain a concentrated brine;
(2) Subjecting the concentrated brine obtained in step (1) to a first adsorption with a resin adsorbent to obtain a lithium extraction mother liquor;
(3) Subjecting the lithium extraction mother liquor obtained in step (2) to a secondary adsorption with a manganese-based lithium adsorbent to obtain an adsorbed manganese-based lithium adsorbent;
(4) Desorbing the adsorbed manganese-based lithium adsorbent obtained in step (3) using a desorbent to obtain a lithium precipitation mother liquor;
(5) Sequentially subjecting the lithium precipitation mother liquor obtained in step (4) to impurity removal, concentration by evaporation, and lithium precipitation with sodium carbonate to obtain lithium carbonate.

In some embodiments, the low-grade deep brine in step (1) is chloride-type deep brine.

In some embodiments, in step (1), the magnesium-lithium ratio of the low-grade deep brine is 30-50, and the calcium-lithium ratio of the low-grade deep brine is 100-300.

In some embodiments, the low-grade deep brine in step (1) includes the following components in mass percentage: 0.04-0.05% of K, 3.0-4.0% of Na, 0.5-0.6% of Ca, 0.08-0.09% of Mg, 0.002-0.003% of Li, 6.5-7.0% of Cl, other impurities and the balance of water.

In some embodiments, the concentration multiple in step (1) is 9 times.

In some embodiments, the resin adsorbent in step (2) is ion exchange resin D301 or ion exchange resin CR20.

In some embodiments, the ratio of the mass of resin adsorbent to the volume of concentrated brine in step (2) is 1 g: (5-10) mL.

In some embodiments, the time of the first adsorption in step (2) is 2-5 h.

In some embodiments, the product of the first adsorption in step (2) further comprises a saturated resin adsorbent.

In some embodiments, the saturated resin adsorbent is sequentially subjected to desorption and regeneration to obtain a resin adsorbent.

In some embodiments, the resin adsorbent is used for the first adsorption of concentrated brine in step (2).

In some embodiments, the manganese-based lithium adsorbent in step (3) is TMS1.0 manganese-based lithium adsorbent.

In some embodiments, the ratio of the mass of the manganese-based lithium adsorbent to the volume of the lithium extraction mother liquor in step (3) is 1 g: (20-35) mL.

In some embodiments, the time for the secondary adsorption in step (3) is 40-100 min.

In some embodiments, the desorbent in step (4) is a sulfuric acid solution with a concentration of 0.05-0.15 mol/L.

In some embodiments, the ratio of the mass of the adsorbed manganese-based lithium adsorbent to the volume of the desorbent in step (4) is 1 g: (15-30) mL.

In some embodiments, the desorption time in step (4) is 5-30 min.

In some embodiments, the manganese-based lithium adsorbent desorbed in step (4) is washed and used again for the secondary adsorption of the lithium extraction mother liquor in step (3).

The present disclosure provides a method for extracting lithium using a resin adsorbent to pretreat low-grade deep brines, including the following steps: (1) Concentrating a low-grade deep brine to obtain a concentrated brine; (2) Subjecting the concentrated brine obtained in step (1) to a first adsorption with a resin adsorbent to obtain a lithium extraction mother liquor; (3) Subjecting the lithium extraction mother liquor obtained in step (2) to a secondary adsorption with a manganese-based lithium adsorbent to obtain an adsorbed manganese-based lithium adsorbent; (4) Desorbing the adsorbed manganese-based lithium adsorbent obtained in step (3) using a desorbent to obtain a lithium precipitation mother liquor; (5) Sequentially subjecting the lithium precipitation mother liquor obtained in step (4) to impurity removal, concentration by evaporation, and lithium precipitation with sodium carbonate to obtain lithium carbonate. In the present disclosure, resin adsorbent is used to perform adsorption pretreatment on the concentrated brine, which can adsorb organic impurities in the concentrated brine without adsorbing lithium ions, so that the concentration of lithium ions is almost unchanged compared with the feed material, with the subsequent manganese-based lithium adsorbent, the adsorption rate of lithium can be increased by 41%, and the recovery rate of lithium is greatly improved; Compared with treating the concentrated brine using the lime-mirabilite method for removing calcium and magnesium, pretreating the concentrated brine using resin adsorbents has shorter steps, less materials, and does not produce a large amount of low-value product gypsum, which makes the lithium extraction process simpler and easier to operate, and reduces production costs. The results of the examples show that using the method provided by the present disclosure to extract lithium from low-grade deep brine, when the magnesium-lithium ratio of the low-grade brine is 30.74, and the calcium-lithium ratio is 203, the recovery rate of lithium in the lithium precipitation mother liquor can exceed 60%, and the recovery rate of low-grade brine can exceed 60%.

BRIEF DESCRIPTION OF THE DRAWINGS

FIG. 1 is a flowchart of the method for extracting lithium according to Example 1 of the present disclosure.

DETAILED DESCRIPTION OF THE EMBODIMENTS

The present disclosure provides a method for extracting lithium using a resin adsorbent to pretreat low-grade deep brines, including the following steps:
(1) Concentrating a low-grade deep brine to obtain a concentrated brine;
(2) Subjecting the concentrated brine obtained in step (1) to a first adsorption with a resin adsorbent to obtain a lithium extraction mother liquor;
(3) Subjecting the lithium extraction mother liquor obtained in step (2) to a secondary adsorption with a manganese-based lithium adsorbent to obtain an adsorbed manganese-based lithium adsorbent;
(4) Desorbing the adsorbed manganese-based lithium adsorbent obtained in step (3) using a desorbent to obtain a lithium precipitation mother liquor;
(5) Sequentially subjecting the lithium precipitation mother liquor obtained in step (4) to impurity removal, concentration by evaporation, and lithium precipitation with sodium carbonate to obtain lithium carbonate.

In the present disclosure, the low-grade deep brines are concentrated to obtain concentrated brines. By concentrating the low-grade deep brines, the present disclosure can increase the concentration of lithium in the low-grade deep brines, meanwhile precipitate sodium chloride, and reduce the impurity content.

In the present disclosure, the low-grade deep brine is preferably chloride-type deep brine; the magnesium-lithium ratio of the low-grade deep brine is preferably 30-50, more preferably 30-40; the calcium-lithium ratio of the low-grade deep brine is preferably 100-300, more preferably 150-250, and further preferably 200-230. In the present disclosure, the low-grade deep brine preferably includes the following components in mass percentage: 0.04-0.05% of K, 3.0-4.0% of Na, 0.5-0.6% of Ca, 0.08-0.09% of Mg, 0.002-0.003% of Li, 6.5-7.0% of Cl, other impurities and the balance of water, more preferably 0.044% of K, 3.75% of Na, 0.55% of Ca, 0.083% of Mg, 0.0027% of Li, 6.93% of Cl, other impurities and the balance of water. In the present disclosure, the low-grade deep brine is preferably low-grade deep brine in the Qaidam Basin (water emergence level of more than 2000 m). The low-grade deep brine used in the present disclosure has the characteristics of low magnesium-lithium ratio and high calcium-lithium ratio. By pretreating the low-grade deep brine with high calcium-lithium ratio, a method for extracting lithium with high recovery rate of lithium is obtained.

In the present disclosure, the concentration multiple is preferably 9 times. In the present disclosure, the method of concentration is preferably natural evaporation. In the present disclosure, with the increase of the concentration multiple of brine, the concentration of the lithium ions in the brine gradually increases, and the viscosity of the brine and the lithium loss rate are gradually increasing. When the pretreatment using resin adsorbent is performed, excessive viscosity of the brine will make the resin difficult to flow during the stirring process and difficult to handle. Limiting the concentration multiple to 9 times can make the pretreatment effect of resin on the brine more ideal, and can also reduce the lithium loss rate in the natural evaporation stage.

After the concentration is completed, the present disclosure preferably separates the concentrated product to obtain concentrated brine and sodium chloride. The present disclosure does not specifically limit the specific operation of the separation, the separation process well known to those skilled in the art can be used.

After the concentrated brine is obtained, the present disclosure uses a resin adsorbent to perform a first adsorption on the concentrated brine to obtain a lithium extraction mother liquor.

In the present disclosure, the resin adsorbent is preferably ion exchange resin D301 or ion exchange resin CR20, more preferably ion exchange resin D301 or ion exchange resin CR20 produced by Tianjin Yunkai Resin Technology Co., Ltd. The ion exchange resin D301 or ion exchange resin CR20 used in the present disclosure can effectively exchange inorganic acid and silicate in acidic near-neutral medium, and can absorb impurities with larger molecular size, and the resin has the advantages of high regeneration efficiency, large exchange capacity, strong anti-pollution ability and good mechanical strength, and can be recycled.

In the present disclosure, the ratio of the mass of resin adsorbent to the volume of the concentrated brine is preferably 1 g: (5-10) mL, and more preferably 1 g: 6 mL. The present disclosure controls the ratio of the mass of the resin adsorbent and the volume of the concentrated brine within the above range, which can improve the adsorption efficiency of the resin adsorbent to the impurities in the concentrated brine.

In the present disclosure, the time of the first adsorption is preferably 2-5 h, more preferably 3 h. In the present disclosure, there is no special limitation on the temperature of the first adsorption, the adsorption at room temperature can be adopted. The present disclosure controls the time of the first adsorption within the above range, which can ensure that the resin adsorbent can fully adsorb the impurities in the concentrated brine.

After the adsorption is completed, the present disclosure preferably performs a solid-liquid separation on the product of first adsorption to obtain a lithium extraction mother liquor and a saturated resin adsorbent. The present disclosure does not specifically limit the specific operation of the solid-liquid separation, the process well known to those skilled in the art can be used.

In the present disclosure, the saturated resin adsorbent is preferably subjected to desorption and regeneration treatments in sequence to obtain a resin adsorbent, and then the resin adsorbent is used again for the first adsorption of concentrated brine.

After the lithium extraction mother liquid is obtained, the present disclosure uses a manganese-based lithium adsorbent to perform a secondary adsorption on the lithium extraction mother liquid to obtain an adsorbed manganese-based lithium adsorbent.

In the present disclosure, the manganese-based lithium adsorbent is TMS1.0 manganese-based lithium adsorbent; the TMS1.0 manganese-based lithium adsorbent is preferably TMS1.0 manganese-based lithium adsorbent produced by Qinghai Kuajie Separation Technology Co., Ltd. The manganese-based lithium adsorbent used in the present disclosure has higher lithium adsorption performance.

In the present disclosure, the ratio of the mass of the manganese-based lithium adsorbent to the volume of the lithium extraction mother liquor is preferably 1 g: (20-35) mL, and more preferably 1 g: 30 mL. In the present disclosure, the dosage of the manganese-based lithium adsorbent and the lithium extraction mother liquid is controlled within the above range which can improve the recovery rate of lithium by the manganese-based lithium adsorbent.

In the present disclosure, the time of the secondary adsorption is preferably 40-100 min, more preferably 60 min. The present disclosure does not specifically limit the temperature of the secondary adsorption, and the adsorption at room temperature can be adopted. The present disclosure controls the time of secondary adsorption within the above range, which can ensure that the manganese-based lithium adsorbent can fully adsorb lithium.

After the adsorption is completed, the present disclosure preferably performs a solid-liquid separation on the product of the secondary adsorption to obtain the adsorbed manganese-based lithium adsorbent and the tail liquid. The present disclosure does not specifically limit the specific operation of the solid-liquid separation, the process well known to those skilled in the art can be used.

After the adsorbed manganese-based lithium adsorbent is obtained, the present disclosure uses a desorbent to desorb the adsorbed manganese-based lithium adsorbent to obtain a lithium precipitation mother liquor.

In the present disclosure, the desorbent is preferably a sulfuric acid solution with a concentration of 0.05-0.15 mol/L, more preferably a sulfuric acid solution with a concentration of 0.1 mol/L; the ratio of the mass of the adsorbed manganese-based lithium adsorbent to the volume of the desorbent is preferably 1 g: (15-30) mL, more preferably 1 g: 20 mL; the desorption time is preferably 5-30 min, more preferably 10-20 min. The present disclosure uses the above desorbent for desorption, so that the adsorbed lithium in the manganese-based lithium adsorbent can completely enter the desorbent, while avoiding problems such as the high dissolution loss rate of the adsorbent caused by the high concentration of the sulfuric acid solution, increasing the consumption of the adsorbent, the large amount of sulfuric acid solution caused by the low concentration of the sulfuric acid solution, and the prolonged desorption time.

After the desorption is completed, the present disclosure preferably performs a solid-liquid separation on the desorbed product to obtain the lithium precipitation mother liquor and the desorbed manganese-based lithium adsorbent. The present disclosure does not specifically limit the specific operation of the solid-liquid separation, the process well known to those skilled in the art can be used.

In the present disclosure, the desorbed manganese-based lithium adsorbent is preferably used for secondary adsorption of the lithium extraction mother liquor after being washed. The present disclosure does not specifically limit the specific washing process, any process that can wash the manganese-based lithium adsorbent to neutrality can be used.

After the lithium precipitation mother liquor is obtained, the present disclosure sequentially subjects the lithium precipitation mother liquor to impurity removal, concentration by evaporation, and lithium precipitation with sodium carbonate to obtain lithium carbonate. In the present disclosure, there are no special restrictions on the specific operations of concentration by evaporation and lithium precipitation with sodium carbonate, the process well known to those skilled in the art can be used.

In the present disclosure, the concentrated brine is first pretreated using a resin adsorbent, so that the concentration of lithium ions is almost unchanged compared with the feed material, and then a manganese-based lithium adsorbent is used for adsorption and lithium extraction, so that the adsorption rate of lithium can be improved by 41%; Compared with treating the concentrated brine using the lime-mirabilite method for removing calcium and magnesium, pretreating the concentrated brine using resin adsorbents has shorter steps, less materials, and does not produce a large amount of low-value product gypsum, which makes the lithium extraction process simpler and easier to operate, and reduces production costs.

The technical schemes of the present disclosure will be clearly and completely described below in conjunction with the embodiments of the present disclosure. Obviously, the described embodiments are only a part of the embodiments of the present disclosure, rather than all the embodiments. Based on the embodiments of the present disclosure, all other embodiments obtained by the persons skilled in the art without creative work shall fall within the protection scope of the present disclosure.

Example 1

A method for extracting lithium using a resin adsorbent to pretreat low-grade deep brines which is composed by the following steps:
(1) The low-grade deep brine was concentrated to obtain a concentrated brine with a concentration multiple of 9 times; the low-grade deep brine comprises the following components in mass percentage: 0.044% of K, 3.75% of Na, 0.55% of Ca, 0.083% of Mg, 0.0027% of Li, 6.93% of Cl, other impurities and the balance of water; the magnesium-lithium ratio of the low-grade deep brine is 30.74, and the calcium-lithium ratio of the low-grade deep brine is 203;
(2) The concentrated brine obtained in step (1) was subjected to a first adsorption using ion exchange resin D301, after the first adsorption was completed, the product of the first adsorption was subjected to a solid-liquid separation to obtain the lithium extraction mother liquor; the ratio of the mass of the resin adsorbent to the volume of concentrated brine was 1 g: 6 mL; the time of the first adsorption was 3 h, and the temperature of the first adsorption was normal temperature;
(3) The lithium extraction mother liquor obtained in step (2) was subjected to a secondary adsorption using TMS1.0 manganese-based lithium adsorbent, after the secondary adsorption was completed, the product of the secondary adsorption was subjected to a solid-liquid separation to obtain the adsorbed manganese-based lithium adsorbent; the ratio of the mass of the manganese-based lithium adsorbent to the volume of the lithium extraction mother liquor was 1 g: 30 mL; the time of the secondary adsorption was 60 min, and the temperature of the secondary adsorption was normal temperature;
(4) The adsorbed manganese-based lithium adsorbent obtained in step (3) was desorbed using a desorbent, after the desorption was completed, the product was subjected to a solid-liquid separation to obtain a lithium precipitation mother liquor; the desorbent was a 0.1 mol/L sulfuric acid solution; the ratio of the mass of the adsorbed manganese-based lithium adsorbent to the volume of the desorbent was 1 g: 20 mL; and the desorption time was 10 min;
(5) The lithium precipitation mother liquor obtained in step (4) was subjected to impurity removal, concentration by evaporation, and lithium precipitation with sodium carbonate in sequence to obtain lithium carbonate;

The low-grade deep brine was low-grade deep brine in the Qaidam Basin (water emergence level of more than 2000 m); the resin adsorbent was ion exchange resin D301 produced by Tianjin Yunkai Resin Technology Co., Ltd.; the TMS1.0 manganese-based lithium adsorbent was a TMS1.0 manganese-based lithium adsorbent produced by Qinghai Kuajie Separation Technology Co., Ltd.

The flowchart of the method for extracting lithium using the resin adsorbent for pretreatment provided in Example 1 of the present disclosure is shown in FIG. 1. It can be seen from FIG. 1 that the low-grade deep brine is naturally evaporated and then concentrated to obtain the concentrated brine. The concentrated brine is adsorbed by the resin adsorbent to obtain the lithium extraction mother liquor. At the same time, the saturated resin adsorbent can be reused after desorption and regeneration, and the consumption is less in the process. The lithium extraction mother liquor is desorbed after being absorbed by the manganese-based lithium adsorbent to obtain a high-concentration lithium precipitation mother liquor and manganese-based lithium adsorbent. The manganese-based lithium adsorbent is reused for the adsorption of the lithium extraction mother liquor, and the lithium precipitation mother liquor is subjected to impurity removal and concentration again to remove residual calcium and magnesium, and to precipitate sodium chloride. At the same time, the concentrated mother liquor is subjected to lithium precipitation with sodium carbonate to obtain the finished product lithium carbonate and residual brine. The residual brine is reused to prepare low-grade deep brine, so that the brine is recycled.

Example 2

A method for extracting lithium using a resin adsorbent to pretreat low-grade deep brines which is composed by the following steps:
(1) The low-grade deep brine was concentrated to obtain a concentrated brine with a concentration multiple of 9 times; the low-grade deep brine comprises the following components in mass percentage: 0.044% of K, 3.75% of Na, 0.55% of Ca, 0.083% of Mg, 0.0027% of Li, 6.93% of Cl, other impurities and the balance of water; The magnesium-lithium ratio of the low-grade deep brine was 30.74, and the calcium-lithium ratio of the low-grade deep brine was 203;
(2) The concentrated brine obtained in step (1) was subjected to a first adsorption using ion exchange resin CR20, after the first adsorption was completed, the product of the first adsorption was subjected to a solid-liquid separation to obtain the lithium extraction mother liquor; the ratio of the mass of the resin adsorbent to the volume of concentrated brine was 1 g: 6 mL; the time of the first adsorption was 3 h, and the temperature of the first adsorption was normal temperature;
(3) The lithium extraction mother liquor obtained in step (2) was subjected to a secondary adsorption using TMS1.0 manganese-based lithium adsorbent, after the secondary adsorption was completed, the product of the secondary adsorption was subjected to a solid-liquid separation to obtain the adsorbed manganese-based lithium adsorbent; the ratio of the mass of the manganese-based lithium adsorbent to the volume of the lithium extraction mother liquor was 1 g: 30 mL; the time of the secondary adsorption was 60 min, and the temperature of the secondary adsorption was normal temperature;

(4) The adsorbed manganese-based lithium adsorbent obtained in step (3) was desorbed using a desorbent, after the desorption was completed, the product was subjected to a solid-liquid separation to obtain a lithium precipitation mother liquor; the desorbent was a 0.1 mol/L sulfuric acid solution; the ratio of the mass of the adsorbed manganese-based lithium adsorbent to the volume of the desorbent was 1 g: 20 mL; and the desorption time was 10 min;

(5) The lithium precipitation mother liquor obtained in step (4) was subjected to impurity removal, concentration by evaporation, and lithium precipitation with sodium carbonate in sequence to obtain lithium carbonate;

The low-grade deep brine was low-grade deep brine in the Qaidam Basin (water emergence level of more than 2000 m); the resin adsorbent was ion exchange resin CR20 produced by Tianjin Yunkai Resin Technology Co., Ltd.; the TMS1.0 manganese-based lithium adsorbent was a TMS1.0 manganese-based lithium adsorbent produced by Qinghai Kuajie Separation Technology Co., Ltd.

Comparative Example 1

A method for extracting lithium using a resin adsorbent to pretreat low-grade deep brines which is composed by the following steps:

(1) The low-grade deep brine was concentrated to obtain a concentrated brine with a concentration multiple of 9 times; the low-grade deep brine comprises the following components in mass percentage: 0.044% of K, 3.75% of Na, 0.55% of Ca, 0.083% of Mg, 0.0027% of Li, 6.93% of Cl, other impurities and the balance of water; the magnesium-lithium ratio of the low-grade deep brine was 30.74, and the calcium-lithium ratio of the low-grade deep brine was 203;

(2) The lithium extraction mother liquor obtained in step (1) was adsorbed using TMS1.0 manganese-based lithium adsorbent, after the adsorption was completed, the product was subjected to a solid-liquid separation to obtain the adsorbed manganese-based lithium adsorbent; the ratio of the mass of the manganese-based lithium adsorbent to the volume of the lithium extraction mother liquor was 1 g: 30 mL; the time of the secondary adsorption was 60 min, and the temperature of the secondary adsorption was normal temperature;

(3) The adsorbed manganese-based lithium adsorbent obtained in step (1) was desorbed using a desorbent, after the desorption was completed, the product was subjected to a solid-liquid separation to obtain a lithium precipitation mother liquor; the desorbent was a 0.1 mol/L sulfuric acid solution; the ratio of the mass of the adsorbed manganese-based lithium adsorbent to the volume of the desorbent was 1 g: 20 mL; and the desorption time is 10 min;

(4) The lithium precipitation mother liquor obtained in step (3) was subjected to impurity removal, concentration by evaporation, and lithium precipitation with sodium carbonate in sequence to obtain lithium carbonate;

The low-grade deep brine was low-grade deep brine in the Qaidam Basin (water emergence level of more than 2000 m); and the TMS1.0 manganese-based lithium adsorbent was a TMS1.0 manganese-based lithium adsorbent produced by Qinghai Kuajie Separation Technology Co., Ltd.

Comparative Example 2

A method for extracting lithium using a resin adsorbent to pretreat low-grade deep brines which is composed by the following steps:

(1) The low-grade deep brine was concentrated to obtain a concentrated brine with a concentration multiple of 28 times; the low-grade deep brine comprises the following components in mass percentage: 0.044% of K, 3.75% of Na, 0.55% of Ca, 0.083% of Mg, 0.0027% of Li, 6.93% of Cl, other impurities and the balance of water; the magnesium-lithium ratio of the low-grade deep brine was 30.74, and the calcium-lithium ratio of the low-grade deep brine was 203;

(2) The lithium extraction mother liquor obtained in step (1) was adsorbed using TMS1.0 manganese-based lithium adsorbent, after the adsorption was completed, the product was subjected to a solid-liquid separation to obtain the adsorbed manganese-based lithium adsorbent; the ratio of the mass of the manganese-based lithium adsorbent to the volume of the lithium extraction mother liquor was 1 g: 30 mL; the time of the secondary adsorption was 60 min, and the temperature of the secondary adsorption was normal temperature;

(3) The adsorbed manganese-based lithium adsorbent obtained in step (1) was desorbed using a desorbent, after the desorption was completed, the product was subjected to a solid-liquid separation to obtain a lithium precipitation mother liquor; the desorbent was a 0.1 mol/L sulfuric acid solution; the ratio of the mass of the adsorbed manganese-based lithium adsorbent to the volume of the desorbent was 1 g: 20 mL; and the desorption time was 10 min;

(4) The lithium precipitation mother liquor obtained in step (3) was subjected to concentration by evaporation, and lithium precipitation with sodium carbonate in sequence to obtain lithium carbonate;

The low-grade deep brine was low-grade deep brine in the Qaidam Basin (water emergence level of more than 2000 m); and the TMS1.0 manganese-based lithium adsorbent was a TMS1.0 manganese-based lithium adsorbent produced by Qinghai Kuajie Separation Technology Co., Ltd.

Comparative Example 3

A method for extracting lithium using a resin adsorbent to pretreat low-grade deep brines which is composed by the following steps:

(1) The low-grade deep brine was concentrated to obtain a concentrated brine with a concentration multiple of 28 times; the low-grade deep brine comprises the following components in mass percentage: 0.044% of K, 3.75% of Na, 0.55% of Ca, 0.083% of Mg, 0.0027% of Li, 6.93% of Cl, other impurities and the balance of water; the magnesium-lithium ratio of the low-grade deep brine was 30.74, and the calcium-lithium ratio of the low-grade deep brine was 203;

(2) The concentrated brine obtained in step (1) was subjected to a first adsorption using ion exchange resin D301, after the first adsorption was completed, the product of the first adsorption was subjected to a solid-liquid separation to obtain the lithium extraction mother liquor; the ratio of the mass of the resin adsorbent to the volume of concentrated brine was 1 g: 6 mL; the time of the first adsorption was 3 h, and the temperature of the first adsorption was normal temperature;

(3) The lithium extraction mother liquor obtained in step (2) was subjected to a secondary adsorption using TMS1.0 manganese-based lithium adsorbent, after the secondary adsorption was completed, the product of the secondary adsorption was subjected to a solid-liquid separation to obtain the adsorbed manganese-based lithium adsorbent; the ratio of the mass of the manganese-based lithium adsorbent to the volume of the lithium extraction mother liquor was 1 g: 30 mL; the time of the secondary adsorption was 60 min, and the temperature of the secondary adsorption was normal temperature;
(4) The adsorbed manganese-based lithium adsorbent obtained in step (3) was desorbed using a desorbent, after the desorption was completed, the product was subjected to a solid-liquid separation to obtain a lithium precipitation mother liquor; the desorbent was a 0.1 mol/L sulfuric acid solution; the ratio of the mass of the adsorbed manganese-based lithium adsorbent to the volume of the desorbent was 1 g: 20 mL; and the desorption time was 10 min;
(5) The lithium precipitation mother liquor obtained in step (4) was subjected to impurity removal, concentration by evaporation, and lithium precipitation with sodium carbonate in sequence to obtain lithium carbonate;

The low-grade deep brine was low-grade deep brine in the Qaidam Basin (water emergence level of more than 2000 m); the resin adsorbent was ion exchange resin D301 produced by Tianjin Yunkai Resin Technology Co., Ltd.; the TMS1.0 manganese-based lithium adsorbent was a TMS1.0 manganese-based lithium adsorbent produced by Qinghai Kuajie Separation Technology Co., Ltd.

Comparative Example 4

A method for extracting lithium using a resin adsorbent to pretreat low-grade deep brines which is composed by the following steps:
(1) The low-grade deep brine was concentrated to obtain a concentrated brine with a concentration multiple of 28 times; the low-grade deep brine comprises the following components in mass percentage: 0.044% of K, 3.75% of Na, 0.55% of Ca, 0.083% of Mg, 0.0027% of Li, 6.93% of Cl, other impurities and the balance of water; the magnesium-lithium ratio of the low-grade deep brine was 30.74, and the calcium-lithium ratio of the low-grade deep brine was 203;
(2) The concentrated brine obtained in step (1) was subjected to a first adsorption using ion exchange resin CR20, after the first adsorption was completed, the product of the first adsorption was subjected to a solid-liquid separation to obtain the lithium extraction mother liquor; the ratio of the mass of the resin adsorbent to the volume of concentrated brine was 1 g: 6 mL; the time of the first adsorption was 3 h, and the temperature of the first adsorption was normal temperature;
(3) The lithium extraction mother liquor obtained in step (2) was subjected to a secondary adsorption using TMS1.0 manganese-based lithium adsorbent, after the secondary adsorption was completed, the product of the secondary adsorption was subjected to a solid-liquid separation to obtain the adsorbed manganese-based lithium adsorbent; the ratio of the mass of the manganese-based lithium adsorbent to the volume of the lithium extraction mother liquor was 1 g: 30 mL; the time of the secondary adsorption was 60 min, and the temperature of the secondary adsorption was normal temperature;
(4) The adsorbed manganese-based lithium adsorbent obtained in step (3) was desorbed using a desorbent, after the desorption was completed, the desorbed product was subjected to a solid-liquid separation to obtain a lithium precipitation mother liquor; the desorbent was a 0.1 mol/L sulfuric acid solution; the ratio of the mass of the adsorbed manganese-based lithium adsorbent to the volume of the desorbent was 1 g: 20 mL; and the desorption time was 10 min;
(5) The lithium precipitation mother liquor obtained in step (4) was subjected to impurity removal, concentration by evaporation, and lithium precipitation with sodium carbonate in sequence to obtain lithium carbonate;

The low-grade deep brine was low-grade deep brine in the Qaidam Basin (water emergence level of more than 2000 m); the resin adsorbent was ion exchange resin CR20 produced by Tianjin Yunkai Resin Technology Co., Ltd.; the TMS1.0 manganese-based lithium adsorbent was a TMS1.0 manganese-based lithium adsorbent produced by Qinghai Kuajie Separation Technology Co., Ltd.

The recovery rates of lithium and brine of Examples 1-2 and Comparative Examples 1-4 are shown in Table 1:

TABLE 1

The recovery rates of lithium and brine in Examples 1-2 and Comparative Examples 1-4

| | steps | product name | product mass | | Li content | Lithium metal content | recovery rate of lithium/% | recovery rate of low-grade brine/% |
|---|---|---|---|---|---|---|---|---|
| Example 1 | step (1) | concentrated brine | 3130.82 | Kg | 0.0274% | 85.8 | 70.42 | 70.42 |
| | | low-grade deep brine | 45120 | Kg | 0.0027% | 121.8 | 100 | |
| | step (2) | lithium extraction mother liquor | 300 | mL | 308 mg/L | 92400.0 | 95.95 | 67.56 |
| | | concentrated brine | 300 | mL | 321 mg/L | 96300.0 | 100 | |
| | step (3) | tail liquid | 65.5 | mL | 2.89 mg/L | 189.3 | 1.02 | 66.87 |
| | | manganese-based lithium adsorbent | 2 | g | / | 18290.7 | 98.98 | |
| | | lithium extraction mother liquor | 60 | mL | 308 mg/L | 18480.0 | 100 | |
| | step (4) | lithium precipitation mother liquor | 201 | mL | 88.2 mg/L | 17728.2 | 96.92 | 64.82 |

TABLE 1-continued

The recovery rates of lithium and brine in Examples 1-2 and Comparative Examples 1-4

| | steps | product name | product mass | | Li content | | Lithium metal content | recovery rate of lithium/% | recovery rate of low-grade brine/% |
|---|---|---|---|---|---|---|---|---|---|
| Example 2 | step (1) | lithium adsorbent | 2 | g | / | | 18290.7 | 100 | |
| | | concentrated brine | 3130.82 | Kg | 0.0274% | | 85.8 | 70.42 | 70.42 |
| | | low-grade deep brine | 45120 | Kg | 0.0027% | | 121.8 | 100 | |
| | step (2) | lithium extraction mother liquor | 300 | mL | 306 | mg/L | 91800.0 | 95.33 | 67.13 |
| | | concentrated brine | 300 | mL | 321 | mg/L | 96300.0 | 100 | |
| | step (3) | tail liquid | 67.5 | mL | 8.0 | mg/L | 540.7 | 2.94 | 65.15 |
| | | manganese-based lithium adsorbent | 2 | g | / | | 17819.3 | 97.06 | |
| | | lithium extraction mother liquor | 60 | mL | 306 | mg/L | 18360.0 | 100 | |
| | step (4) | lithium precipitation mother liquor | 202 | mL | 83.9 | mg/L | 16947.8 | 95.11 | 61.96 |
| Comparative Example 1 | step (1) | lithium adsorbent | 2 | g | / | | 17819.3 | 100 | |
| | | concentrated brine | 3130.82 | Kg | 0.0274% | | 85.8 | 70.42 | 70.42 |
| | | low-grade deep brine | 45120 | Kg | 0.0027% | | 121.8 | 100 | |
| | step (2) | tail liquid | 153 | mL | 198 | mg/L | 30294.0 | 62.92 | 26.11 |
| | | manganese-based lithium adsorbent | 5 | g | 3571 | mg/L | 17856.0 | 37.08 | |
| | | lithium extraction mother liquor | 150 | mL | 321 | mg/L | 48150.0 | 100 | |
| Comparative Example 2 | step (1) | concentrated brine | 1039.57 | Kg | 0.077% | | 79.7 | 65.46 | 65.46 |
| | | low-grade deep brine | 45120 | Kg | 0.0027% | | 121.8 | 100 | |
| | step (2) | tail liquid | 182 | mL | 702.0 | mg/L | 127764.0 | 71.76 | 18.49 |
| | | manganese-based lithium adsorbent | 5 | g | / | | 50286.0 | 28.24 | |
| | | lithium extraction mother liquor | 150 | mL | 1187 | mg/L | 178050.0 | 100 | |
| Comparative Example 3 | step (1) | concentrated brine | 1039.57 | Kg | 0.077% | | 79.7 | 65.46 | 65.46 |
| | | low-grade deep brine | 45120 | Kg | 0.0027% | | 121.8 | 100 | |
| | step (2) | lithium extraction mother liquor | 300 | mL | 989 | mg/L | 296730.0 | 83.05 | 54.36 |
| | | concentrated brine | 300 | mL | 1191 | mg/L | 357300.0 | 100 | |
| | step (3) | tail liquid | 522 | mL | 338 | mg/L | 176436.0 | 74.33 | 13.96 |
| | | manganese-based lithium adsorbent | 8 | g | / | | 60948.0 | 25.67 | |
| | | lithium extraction mother liquor | 240 | mL | 989 | mg/L | 237384.0 | 100 | |
| Comparative Example 4 | step (1) | concentrated brine | 1039.57 | Kg | 0.077% | | 79.74 | 65.46 | 65.46 |
| | | low-grade deep brine | 45120 | Kg | 0.0027% | | 121.82 | 100 | |
| | step (2) | lithium extraction mother liquor | 300 | mL | 1094 | mg/L | 328200 | 91.86 | 60.12 |
| | | concentrated brine | 300 | mL | 1191 | mg/L | 357300 | 100 | |
| | step (3) | tail liquid | 592 | mL | 383.0 | mg/L | 226736 | 86.36 | 8.20 |
| | | manganese-based lithium adsorbent | 8 | g | / | | 35824.00 | 13.64 | |
| | | lithium extraction mother liquor | 240 | mL | 1094 | mg/L | 262560 | 100 | |

It can be seen from Table 1 that when low-grade deep brine with low magnesium-lithium ratio and high calcium-lithium ratio is used as a raw material for lithium recovery, by using a resin adsorbent for pretreatment, the recovery rate of lithium and the recovery rate of brine have been greatly improved compared with the lithium precipitation mother liquor obtained without the treatment with the resin adsorbent.

From the comparative data of Example 1 and Comparative Example 3 in Table 1 and the comparative data of Example 2 and Comparative Example 4, it can be seen that as the concentration multiple increases, the recovery rate of lithium and the recovery rate of concentrated brine gradually decrease. This is because as the concentration multiple increases, the viscosity of the concentrated brine gradually increases, resulting in the deterioration of the recovery rate of lithium by the manganese-based lithium adsorbent. Therefore, it is best to control the concentration multiple to 9 times.

The above are only the preferred embodiments of the present disclosure. It should be pointed out that for the persons skilled in the art, without departing from the principle of the present disclosure, several improvements and modifications can be made, and these improvements and modifications should also be regarded as the protection scope of the present disclosure.

What is claimed is:

1. A method for extracting lithium using a resin adsorbent to pretreat low-grade deep brines, including the following steps:
   (1) concentrating a low-grade deep brine to obtain a concentrated brine;
   (2) subjecting the concentrated brine obtained in step (1) to a first adsorption with a resin adsorbent to obtain a lithium extraction mother liquor;
   (3) subjecting the lithium extraction mother liquor obtained in step (2) to a secondary adsorption with a manganese-based lithium adsorbent to obtain an adsorbed manganese-based lithium adsorbent;
   (4) desorbing the adsorbed manganese-based lithium adsorbent obtained in step (3) using a desorbent to obtain a lithium precipitation mother liquor;
   (5) sequentially subjecting the lithium precipitation mother liquor obtained in step (4) to impurity removal, concentration by evaporation, and lithium precipitation with sodium carbonate to obtain lithium carbonate.

2. The method for extracting lithium according to claim 1, wherein the low-grade deep brine in step (1) is chloride-type deep brine.

3. The method for extracting lithium according to claim 1, wherein in step (1), the magnesium-lithium ratio of the low-grade deep brine is 30-50, and the calcium-lithium ratio of the low-grade deep brine is 100-300.

4. The method for extracting lithium according to claim 2, wherein in step (1), the magnesium-lithium ratio of the low-grade deep brine is 30-50, and the calcium-lithium ratio of the low-grade deep brine is 100-300.

5. The method for extracting lithium according to claim 1, wherein the low-grade deep brine in step (1) includes the following components in mass percentage: 0.04-0.05% of K, 3.0-4.0% of Na, 0.5-0.6% of Ca, 0.08-0.09% of Mg, 0.002-0.003% of Li, 6.5-7.0% of Cl, other impurities and the balance of water.

6. The method for extracting lithium according to claim 2, wherein the low-grade deep brine in step (1) includes the following components in mass percentage: 0.04-0.05% of K, 3.0-4.0% of Na, 0.5-0.6% of Ca, 0.08-0.09% of Mg, 0.002-0.003% of Li, 6.5-7.0% of Cl, other impurities and the balance of water.

7. The method for extracting lithium according to claim 1, wherein the concentration multiple in step (1) is 9 times.

8. The method for extracting lithium according to claim 1, wherein the resin adsorbent in step (2) is ion exchange resin D301 or ion exchange resin CR20.

9. The method for extracting lithium according to claim 1, wherein the ratio of the mass of resin adsorbent to the volume of concentrated brine in step (2) is 1 g: (5-10) mL.

10. The method for extracting lithium according to claim 1, wherein the time of the first adsorption in step (2) is 2-5 h.

11. The method for extracting lithium according to claim 1, wherein the product of the first adsorption in step (2) further comprises a saturated resin adsorbent.

12. The method for extracting lithium according to claim 11, wherein the saturated resin adsorbent is sequentially subjected to desorption and regeneration to obtain a resin adsorbent.

13. The method for extracting lithium according to claim 12, wherein the resin adsorbent is used for the first adsorption of concentrated brine in step (2).

14. The method for extracting lithium according to claim 1, wherein the manganese-based lithium adsorbent in step (3) is TMS1.0 manganese-based lithium adsorbent.

15. The method for extracting lithium according to claim 1, wherein the ratio of the mass of the manganese-based lithium adsorbent to the volume of the lithium extraction mother liquor in step (3) is 1 g: (20-35) mL.

16. The method for extracting lithium according to claim 1, wherein the time of the secondary adsorption in step (3) is 40-100 min.

17. The method for extracting lithium according to claim 1, wherein the desorbent in step (4) is a sulfuric acid solution with a concentration of 0.05-0.15 mol/L.

18. The method for extracting lithium according to claim 1, wherein the ratio of the mass of the adsorbed manganese-based lithium adsorbent to the volume of the desorbent in step (4) is 1 g: (15-30) mL.

19. The method for extracting lithium according to claim 1, wherein the desorption time in step (4) is 5-30 min.

20. The method for extracting lithium according to claim 1, wherein the manganese-based lithium adsorbent desorbed in step (4) is washed and used again for the secondary adsorption of the lithium extraction mother liquor in step (3).

* * * * *